(12) United States Patent
Kralik et al.

(10) Patent No.: US 7,536,311 B1
(45) Date of Patent: May 19, 2009

(54) METHOD AND APPARATUS FOR ESTIMATION OF COMPONENT GATING AND SHORTAGE RISK IN MANUFACTURING OPERATIONS

(75) Inventors: Balazs Kralik, Berkeley, CA (US); Michael Goldbach, Berkeley, CA (US); Paul Dagum, San Francisco, CA (US)

(73) Assignee: Rapt, Inc., Redmond, WA (US)

( * ) Notice: Subject to any disclaimer, the term of this patent is extended or adjusted under 35 U.S.C. 154(b) by 0 days.

(21) Appl. No.: 11/290,405

(22) Filed: Nov. 30, 2005

Related U.S. Application Data

(62) Division of application No. 09/942,249, filed on Aug. 29, 2001, now abandoned.

(60) Provisional application No. 60/229,840, filed on Aug. 31, 2000.

(51) Int. Cl.
    *G06F 17/50* (2006.01)
(52) U.S. Cl. .............................. 705/7; 705/10
(58) Field of Classification Search ............... 705/7
    See application file for complete search history.

(56) References Cited

U.S. PATENT DOCUMENTS

| | | | | |
|---|---|---|---|---|
| 5,331,579 A * | 7/1994 | Maguire et al. | ............... | 703/2 |
| 5,548,518 A | 8/1996 | Dietrich et al. | ........ | 364/468.06 |
| 5,586,252 A * | 12/1996 | Barnard et al. | ............... | 714/48 |
| 5,615,109 A * | 3/1997 | Eder | ............... | 705/8 |
| 5,953,707 A * | 9/1999 | Huang et al. | ............... | 705/10 |
| 5,963,919 A * | 10/1999 | Brinkley et al. | ............... | 705/28 |
| 5,970,465 A * | 10/1999 | Dietrich et al. | ............... | 705/7 |
| 6,259,959 B1 | 7/2001 | Martin | ............... | 700/99 |
| 6,263,253 B1 | 7/2001 | Yang et al. | ............... | 700/99 |
| 6,317,700 B1 * | 11/2001 | Bagne | ............... | 702/181 |
| 6,317,725 B1 * | 11/2001 | Muraoka | ............... | 705/28 |
| 6,516,301 B1 * | 2/2003 | Aykin | ............... | 705/10 |
| 6,684,193 B1 * | 1/2004 | Chavez et al. | ............... | 705/8 |
| 6,868,298 B2 * | 3/2005 | Baweja et al. | ............... | 700/100 |
| 6,876,948 B1 | 4/2005 | Smith | ............... | 702/181 |
| 6,970,841 B1 * | 11/2005 | Cheng et al. | ............... | 705/28 |
| 2002/0188496 A1 * | 12/2002 | Feldman et al. | ............... | 705/10 |

OTHER PUBLICATIONS

Retooling for the Logistics Revolution, Designing Marine Corps Inventories to Support the Warfighter, May 1, 2000. From rand.org/pubs/monograph_reports/ chapters 2 and 3, appendix B.*

Hausman, Warren H. and Lee, Hau L. and Zhang, Alex X. Joint demand fulfillment probability in a multi-item inventory system with independent order-up-to-policies. European Journal of Operational Research, vol. 109 (1998), pp. 646-659.*

(Continued)

*Primary Examiner*—Romain Jeanty
(74) *Attorney, Agent, or Firm*—Perkins Coie LLP

(57) ABSTRACT

A method for estimation of component gating risk in manufacturing operations is disclosed. The method includes generating an altered component plan by altering a component plan for a component, computing a mean production value using the altered component plan, and computing the component gating risk using the mean production value.

10 Claims, 7 Drawing Sheets

OTHER PUBLICATIONS

Soong, T. T. Fundamentals of Probability and Statistics of Engineers, 2004, Chapter 7 (pp. 192-219).*

Zhang, Alex X. Demand Fulfillment Rates in an Assemble-to-order System with Multiple Products and Dependent Demands. Production and Operations Management, vol. 6, No. 3, Fall, 1997, pp. 309-324.*

Hillier, Mark S. Component Commonality in Multiple-period Assemble-to-order Systems. IEE Transactions, vol. 32 (2000), pp. 755-756.*

Gerchak, Yigal and Magazine, Michael J. and Gamble, Bruce. Component Commonality with Service Level Requirements. Management Science, vol. 34, No. 6 (Jun. 1988), pp. 753-760.*

Baker, Kenneth R. and Magazine, Michael J. and Nuttle, Henry L. W. The Effect of Commonality on Safety Stock in a Simple Inventory Model. Management Science, vol. 32, No. 8 (Aug. 1986), pp. 982-988.*

Hillier, Mark S. Product Commonality in Multiple-period Make-to-Stock Systems. Navel Research Logistics (Wiley), vol. 46 (1999), pp. 738-751.*

Harrison, J. Michael and Van Mieghem, Jan A. Multi-resource investment strategies: Operational hedgin under demand uncertainty. European Journal of Operational Research, vol. 113 (1999), pp. 17-29.*

Agrawal, Narendra and Cohen, Morris. Optimal Material Control in an Assembly System with Component Commonality. Naval Research Logistics (Wiley), vol. 48, No. 5 (Jun. 2001), pp. 409-429.*

Rosling, Kaj. Optimal Inventory Policies for Assembly Systems under Random Demands. Operations Research, vol. 37, No. 4. (Jul.-Aug. 1989), pp. 565-579.*

Bass, Frank M., Purdue University, *A New Product Growth For Model Consumer Durables*, Management Science, vol. 15, No. 5, Jan. 1969, pp. 216-227.

Dagum, Camilo, Econometric Research Program Princeton University, *Structural Permanence: Its Role in the Analysis of Structural Dualisms and Dependences and for Prediction and Decision Purposes*, The Economics of Structural Change vol. 1, The International Library of Critical Writings in Economics, An Elgar Reference Collection 1969, pp. 211-235.

Mahajan, Vijay, Muller, Eitan and Bass, Frank M., *New-Product Diffusion Models*, Chapter 8, Handbooks in OR & MS, vol. 5, J. Eliashberg and G.L. Lilien, Eds., 1993, pp. 349-408.

Hanssens, Dominique M. and Leonard, J. Parsons, *Econometric and Time-Series Market Response Models*, Chapter 9, Handbooks in OR & MS, vol. 5, J. Eliashberg and G.L. Lilien, Eds., 1993, pp. 409-464.

Dagum, Paul; Michael Goldbach, and Balazs Kralik, "Demand statistical arbitrage with variants of the uniform production policy, Technical Report TR-14-00" (Confidential internal document), Rapt Technologies Corporation, Jan. 2000, revised Feb. 8, 2000, cover and pp. 1-13.

Dagum, Paul; Michael Goldbach and Balazs Kralik, U.S. Appl. No. 60/213,189, entitled "Method and Apparatus for the Estimation of Mean Production for Assemble-to-Order Manufacturing Operations," filed Jun. 21, 2000, including 43 pages of specification.

"Success Story: Sun Microsystems" (brochure), 2 pages, Dec. 2001.

"Data Sheet: Revenue Director" (brochure), 2 pages, Sep. 2005.

"Rapt And Actuate Announce Strategic Partnership to Deliver Tailored Trading Intelligence Data" (press release), 1 page, 2005, downloaded Aug. 15, 2006 from http://www.actuate.com/corporate/news/pressrelease.asp?pmt-1&ArticleId=605.

"Rapt/Actuate Deliver Interactive and Actionable Content" (press release), 1 page, downloaded Aug. 15, 2006 from http://www.taborcommunications.com/dsstar/01/0116/102571.html.

Paul Dagum, et al.; pending U.S. Patent Application entitled "Method for Optimizing a Multivariate Allocation of Resources"; U.S. Appl. No. 09/491,461, filed Jan. 26, 2000; including Specification: pp. 1-35; Drawings: Figures 1-12 on 12 sheets; and Appendix: 1 page.

* cited by examiner

METHOD AND APPARATUS FOR ESTIMATION OF COMPONENT GATING AND SHORTAGE RISK IN MANUFACTURING OPERATIONS

CROSS-REFERENCE TO RELATED APPLICATIONS

This application is a divisional of U.S. patent application Ser. No. 09/942,249, entitled "Method And Apparatus For Estimation Of Component Gating And Shortage Risk In Manufacturing Operations," filed Aug. 29, 2001, now abandoned and naming Balazs Kralik, Michael Goldbach and Paul Dagum as inventors, which claims priority from U.S. Provisional Application No. 60/229,840, entitled "Method And Business Process For Estimation Of Component Gating And Shortage Risks In Assemble-To-Order Manufacturing Operations," filed Aug. 31, 2000, and naming Balazs Kralik, Michael Goldbach, and Paul Dagum as inventors. These applications are hereby incorporated by reference, in their entirety and for all purposes.

This application is also related to U.S. Provisional Patent Application No. 60/213,189, filed Jun. 21, 2000, which is incorporated by reference herein. It is also related to U.S. patent application Ser. No. 09/412,560, filed Oct. 5, 1999, and Ser. No. 09/491,461, filed Jan. 26, 2000, both of which are incorporated by reference herein.

BACKGROUND OF THE INVENTION

1. Field of the Invention

This invention relates generally to manufacturing resource allocation, and more particularly, to risk management in the procurement of unfinished goods by estimation of component gating and shortage risk.

2. Description of the Related Art

An assemble-to-order (ATO) manufacturing process is one in which products are manufactured from raw components only as orders are received. While ATO processes are more efficient than manufacture-to-stock (MTS) operations, in which products are produced before demand is known, they are not without significant risks. If component availability is below what is required to meet product demand, then fulfillment of orders is either delayed or fails. Conversely, if excess component inventory remains after demand is met, the excess is either returned to the supplier, usually at a loss, or held until future need. Thus any component inventory that does not exactly meet demand incurs some financial loss for the manufacturer. Being able to predict the risk of component shortage for each component allows a manufacturer to make more informed business decisions.

SUMMARY OF THE INVENTION

In one embodiment, a method for estimation of component gating risk in manufacturing operations is disclosed. The method includes generating an altered component plan by altering a component plan for a component, computing a mean production value using the altered component plan, and computing the component gating risk using the mean production value.

In another embodiment, a method for estimation of component gating risk in manufacturing operations is disclosed. The method includes generating an increased component plan by increasing a component plan for a component, computing a first mean production value using the increased component plan, generating a decreased component plan by decreasing the component plan for the component, computing a second mean production value using the decreased component plan, and computing the component gating risk using the first and the second mean production values.

In still another embodiment, a method for estimation of component shortage risk in manufacturing operations is disclosed. The method includes identifying a component and computing r. In this embodiment, r is the component shortage risk, and is defined by $$r = \int_d^\infty N(x, a \cdot \mu, \sqrt{a^T \Sigma a}) dx$$

where d is a maximum expeditable level of the component, $N(x, \mu, \sigma)$ is a normal density function having a mean equal to $\mu$ and a variance equal to $\sigma$, a is a vector of connect rates for the component, $\mu$ is a mean demand, and $\Sigma$ represents demand covariance.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The following is intended to provide a detailed description of examples of the invention and should not be taken to be limiting of the invention itself. Rather, any number of variations may fall within the scope of the invention which is defined in the claims following the description.

Introduction

Described herein are methods and systems that may be usable for estimating component shortage risk and component gating risk. A gating component is one that is the most short and therefore determines the allowable level of production. Gating risk for a particular component is the risk that the component will be the gating component. Estimation of component shortage and gating risks is particularly complicated when a large number of products are made from a large number of the same components, and thus the techniques described herein may be advantageous under such conditions.

When possible, manufacturing operations may find it beneficial to produce their outputs in an ATO fashion. While MTS operations produce outputs before demand for them is revealed, ATO operations generally produce outputs only as orders arrive.

In an ATO operation, the availability of components is a significant variable that controls ability to produce. If component availability is limited (e.g., because inventory is limited, or because supplier commitments to ship the component on demand are insufficient), then fulfillment of demand either fails or is delayed.

If component planners must negotiate component supply contracts (which specify the number of each component to ship in a planning period) before demand is realized, there is a residual risk that some components will be in short supply. Estimating this risk may help inform supply contract negotiation.

Component Shortage Risk quantifies the risk that in a planning period there will be more need than availability for a particular component. In other words, Component Shortage Risk for a particular component is the risk that there will be a shortage of that particular component.

Component Gating Risk quantifies the risk that a particular component will be the cause of a failure to fulfill an order. In many situations more than one component may be short. But one of the short components—the one that is the most short—is the "gating component." That is, the gating component is the component that determines the level of production. Component Gating Risk for a particular component is the risk that that particular component will be the gating component.

Figure 1:
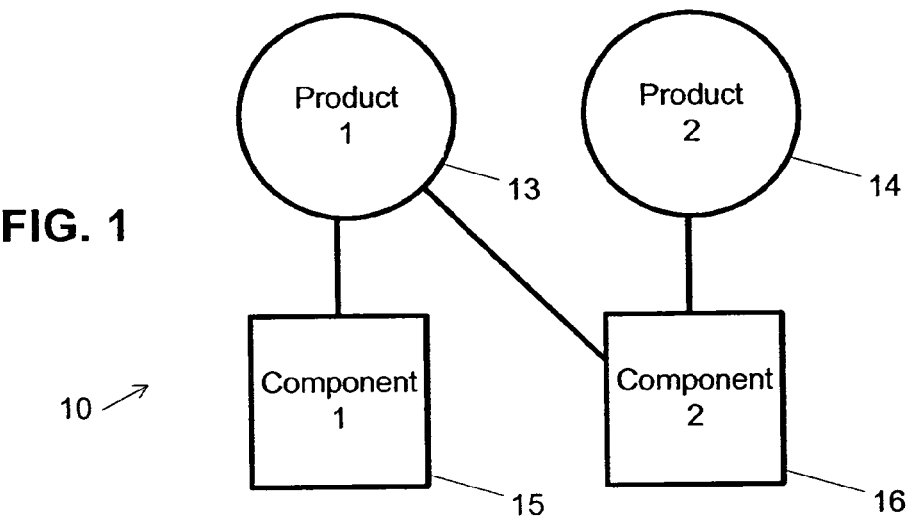
FIG. 1 is a schematic diagram illustrating a "p2c2" relationship between products and components.

FIG. 1 is a schematic diagram illustrating a "p2c2" model 10 of products and components. In this model, two components 15 and 16 are used to make two products 13 and 14. Component 1 (15) is associated with Product 1 (13), as indicated by a line connecting these blocks. Similarly, Component 2 (16) is associated with Product 2 (14). An additional association is also indicated between Component 2 and Product 1.

Figure 2:
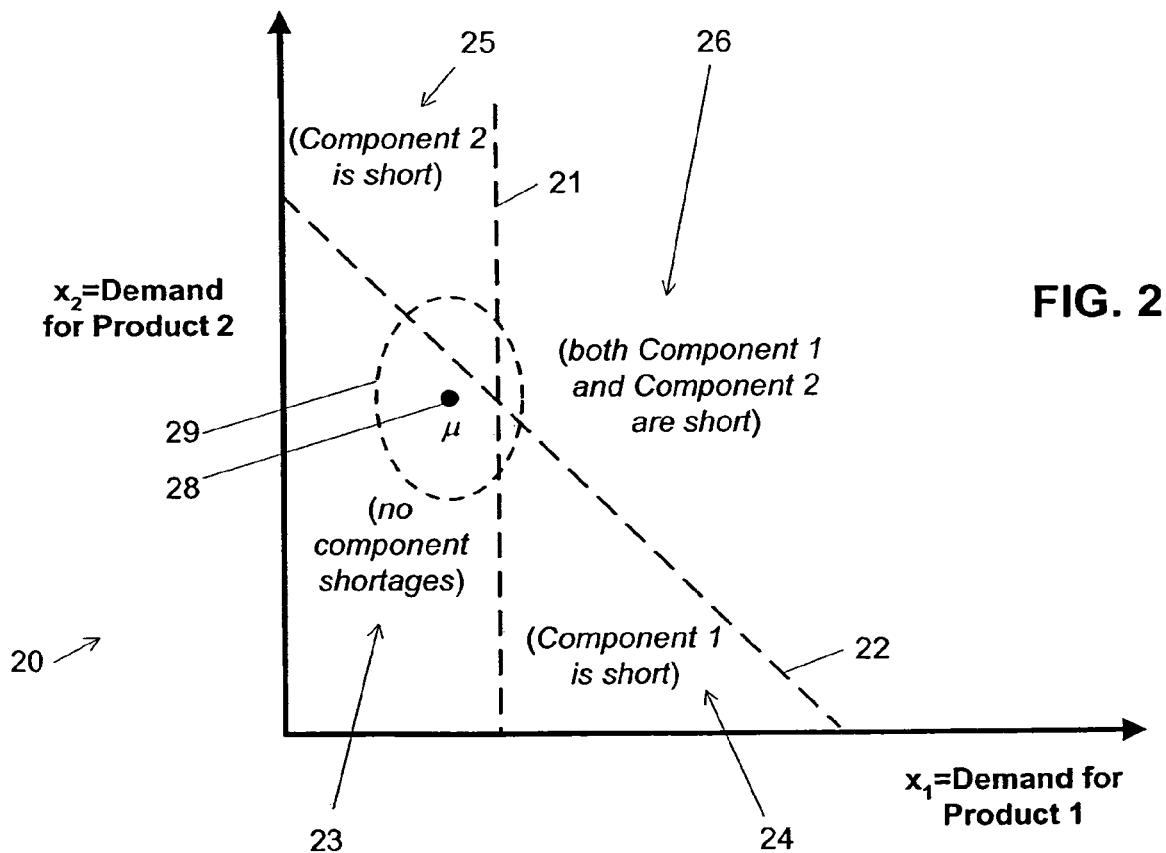
FIG. 2 is a graph of demand showing regions of shortage for components from FIG. 1.
Figure 3:
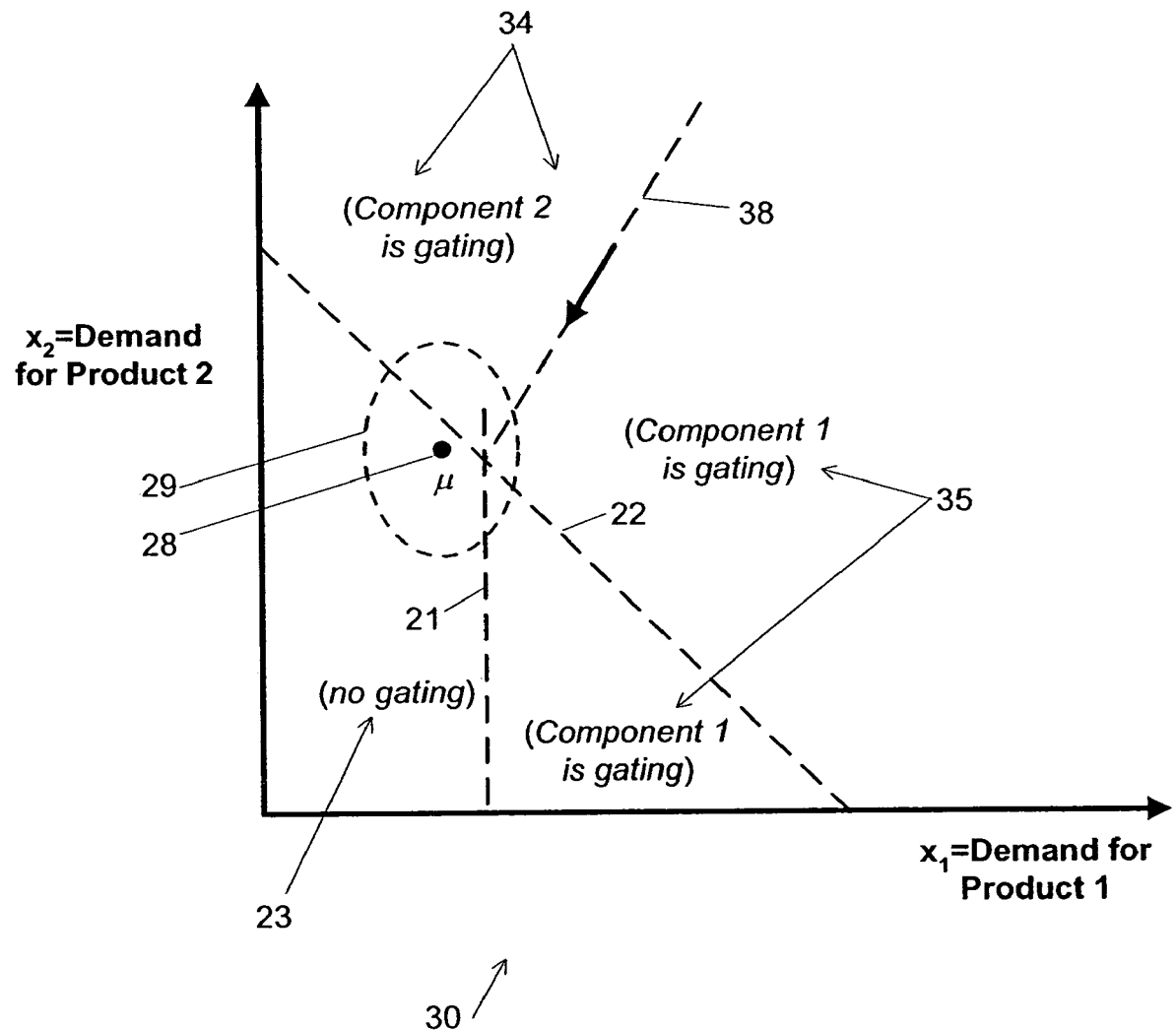
FIG. 3 is a graph of demand showing regions of gating for components from FIG. 1.

The behavior of model 10 is further described in the graph of FIGS. 2 and 3. These graphs illustrate a behavior that is consistent with the associations shown in FIG. 1.

FIG. 2 is a graph 20 of demand showing regions of shortage for components in the model 10. The horizontal axis represents the demand for Product 1, denoted as $x_1$. The vertical axis represents the demand for Product 2, denoted as $x_2$.

The graph 20 includes four regions 23, 24, 25, and 26, which are separated by a vertical line 21 and a sloped line 22. The vertical line 21 is shown as separating situations of no component shortages from situations where production is restricted by a shortage of Component 1. The sloped line 22 is shown as separating situations of no component shortages from situations where production is restricted by a shortage of Component 2.

Region 23 is located to the left of the vertical line 21 and below the sloped line 22. Thus, region 23 has values of the demands $x_1$ and $x_2$ that are feasible: in this region there is enough of Component 1 and of Component 2 to meet the demands for Product 1 and Product 2. Thus, in this region 23 the demanded number of units ($x_1$) of Product 1 does not exceed the amount that can be made from the available supply of Component 1, which is needed for Product 1. Also, in this region 23 the demanded number of units of Product 1 combined with the demanded number of units of Product 2 ($x_1 + x_2$) does not exceed the amount that can be made from the available supply of Component 2, which is needed both for Product 1 and for Product 2.

Region 24 is located to the right of the vertical line 21 and below the sloped line 22. Thus, region 24 has values of the demands $x_1$ and $x_2$ that would result in a shortage of Component 1: in this region there is enough of Component 2 but not enough of Component 1 to meet the demands for Product 1 and Product 2.

Region 25 is located to the left of the vertical line 21 and above the sloped line 22. Thus, region 25 has values of the demands $x_1$ and $x_2$ that would result in a shortage of Component 2: in this region there is enough of Component 1 but not enough of Component 2 to meet the demands for Product 1 and Product 2.

Region 26 is located to the right of the vertical line 21 and above the sloped line 22. Thus, region 26 has values of the demands $x_1$ and $x_2$ that would result in a shortage of both Component 1 and Component 2: in this region there is not enough of Component 1 and not enough of Component 2 to meet the demands for Product 1 and Product 2.

Production is feasible if the demands $x_1$ and $x_2$ fall in the feasible region 23. In those situations, the demands $x_1$ and $x_2$ can be met by the available supply of components. The feasible region may be denoted by the symbol $\Omega$. In the model 10 depicted in FIGS. 1 and 2, the feasible region $\Omega$ is defined by the boundaries provided by the vertical line 21 and the sloped line 22. It may be seen that these conditions can be written more generally as:

$$\Omega = \{\overline{a}_i \cdot \overline{x} \leq d_i \, \forall i\} \tag{1}.$$

In Eq. 1, the vector $\overline{x}$ represents the demand for products. The quantity $d_i$ in Eq. 1 represents the maximum component availability or the maximum expeditable level of component i. The vector $\overline{a}_i$ are the "connect rates" for component i. Connect rates between products and components represent the number of components required for the manufacture of one unit of product. Connect rates may be used to describe the consumption of components for each unit of the various products. The vector $\overline{a}_i$ represents the bill of materials needed to make one unit of product i.

In the two-product model 10 discussed above, $\overline{x}$ could be written as $(x_1, x_2)$. The quantity $d_i$ would be $d_1$ for Component 1 (i=1), and $d_2$ for Component 2 (i=2).

A shortage event occurs if the realized demand $\overline{x}$ is such that $\overline{a}_i \cdot \overline{x} > d_i$.

A forecasted set of demands may be represented by the vector variable $\overline{x} = (x_1, x_2, \ldots)$, which includes a scalar value for each of the products in a production scheme. This demand vector may be understood as having an expected value that is represented by $\overline{\mu} = (\mu_1, \mu_2, \ldots)$ and a probability distribution that allows for the occurrence of other values of the demand vector. The probability distribution of the demand vector $\overline{x}$ may be modeled as a normal distribution with a mean value of $\overline{\mu}$ and a distribution that is represented by a covariance matrix denoted as $\Sigma$.

The vector notation may also be generalized to describe a general number of components. For example, the vector quantity $\overline{d} = (d_1, d_2, \ldots)$ may be used to indicate the component availability. This vector includes a scalar value for each of the components in a production scheme.

As illustrated in FIG. 2, the expected value $\bar{\mu}$ 28 of the demand vector may be located in the feasible region 23. However, as illustrated in the figure, the distribution 29 of the possible demand may extend into one or more of the non-feasible regions 24, 25, and 26. The distribution 29 is represented schematically by an ellipse. This ellipse 29 indicates an iso-probability curve that connects values of $\bar{x}$ that are equally likely. Because the distribution has some overlap with the non-feasible regions, there is a non-zero chance that the demand for a set of products may not be feasible with the component availability $\bar{d}$. There may therefore be a risk that the actual demand vector will fall outside the feasible region, resulting in a shortage of one or more of the components. The shortage risk $r_i$ for a component i may be understood as the probability that the demand for that component will exceed the maximum availability $d_i$ of that component. This quantity may be calculated according to the following formula.

$$r_i = \int_{t_i}^{\infty} N\left(x, \bar{a}_i \cdot \bar{\mu}, \sqrt{\bar{a}_i^T \Sigma \bar{a}_i}\right) dx \tag{2}$$

In Eq. 2, it may be seen that x is an integration variable that runs through the non-feasible values of component i: from $d_i$ to infinity. The function $N(x,\mu,\sigma)$ is the normal density distribution of a variable x with mean of $\mu$ and a variance of $\mu^2$.

FIG. 3 is a graph of demand showing regions of gating for components from FIG. 1. Again, the horizontal axis represents the demand $x_1$ for Product 1 and the vertical axis represents the demand $x_2$ for Product 2. FIG. 3 also includes the vertical line 21 and the sloped line 22.

FIG. 3 additionally includes a sloped line 38 that has one end at the intersection of lines 21 and 22, and which divides the combined shortage regions (24, 25, and 26 from FIG. 2) into two new regions 34 and 35. (The sloped line 38 may be defined by a policy vector, shown in bold.) Region 34 is to the left of the sloped line 38. Region 35 is to the right of the sloped line 38.

Region 35 represents situations in which Component 1 would completely run out if an attempt were made to produce the demanded amounts $x_1$ and $x_2$ of Products 1 and 2. That is, Component 1 is the gating component in region 35. Similarly, region 34 represents situations in which Component 2 would completely run out if an attempt were made to produce the demanded amounts $x_1$ and $x_2$ of Products 1 and 2. That is, Component 2 is the gating component in region 34. Since the demand is met by the components in region 23, neither Component 1 nor Component 2 is gating in region 23.

The regions of gating risk 34 and 35 are illustrated in FIG. 3. Intuitively, the component i is the gating component in situations where the demand is $\bar{x}$ and the component availability is $\bar{d}$ if the production $\bar{q}(\bar{x},\bar{d})$ falls on the $d_i$-face of the feasible region $\Omega$. (The complement $\Omega$ is the infeasible region, denoted as $\bar{\Omega}$.) More strictly, given a demand event $\bar{x}$, a component plan $\bar{d}$, and a production policy $\bar{q}$: $\bar{x} \in \Re^n$, $\bar{d} \in \Re^m \to \Re^n$, a component i may be understood as a gating component if and only if $\bar{q}(\bar{x},\bar{d})$ falls on the face of the feasible region $\Omega$ associated with component i. In other words, a component i may be understood as a gating component if and only if:

$$\bar{a}_i \cdot \bar{q}(\bar{x},\bar{d}) = d_i \tag{3}$$

For a production policy such as depicted in FIG. 3, it may be readily seen that the space where more than one component is gating is of measure zero, except in the degenerate case where there are two components 1 and 2 such that $\bar{a}_1 = \bar{a}_2$ and $d_1 = d_2$. This degenerate case of measure zero may be excluded from the following discussion.

Gating risk may also be understood as: given a demand $\bar{x}$, whichever component actually runs out completely upon producing the production amount $\bar{q}(\bar{x},\bar{d})$ is the gating component.

Now consider the function $g_i(\bar{x},\bar{d})$, where:

$$g_i(\vec{x},\vec{d}) = \vec{a}_i \cdot \vec{q}(\vec{x},\vec{d}) = \begin{cases} \vec{a}_i \cdot \vec{x} & \text{if } x \in \Omega \\ d_i & \text{if } x \in \bar{\Omega} \text{ and } i \text{ is gating} \\ \tilde{g}_i(\vec{x},\vec{d}) \leq d_i & \text{otherwise} \end{cases} \tag{4}$$

In the above definition, $\tilde{g}_i$ is a function that depends on the problem details. Its region of definition $\Psi_i$ is the intersection of the infeasible region $\bar{\Omega}$ with the complement of the region where component i is the gating component.

For a production policy such as depicted in FIG. 3, $\tilde{g}_i$ has an additional property: in its region of definition, it is independent of $d_i$. This is considered the "gate mapping" property. An allocation policy is gate mapping if the following condition holds for every demand vector $\bar{x}$: If for both $\bar{d}=(d_1, \ldots, d_i, \ldots, d_n)$ and $\bar{d}'=(d_1, \ldots, d'_i, \ldots, d_n)$ the gating component is the same (component j, with j≠i), then $\bar{q}(\bar{x},\bar{d})=\bar{q}(\bar{x},\bar{d}')$.

A corollary is that a production policy is gate mapping if and only if $$\frac{\partial}{\partial d_i} g_i(\vec{x},\vec{d}) = 0 \text{ if } \vec{x} \in \Psi_i \tag{5}$$

For gate mapping production policies, by definition $g_i$ is independent of $d_i$ unless component i is actually gating. This observation relates to the first and third conditions in the second line of Eq. 4. Conversely, if i is gating then $\partial g_i(\bar{x},\bar{d})/\partial d_i = 1$ according to the second condition in the second line of Eq. 4. Hence the gating component can easily be identified by examining the derivatives of the $g_i$.

The gating risk $G_i$ for component i may be understood as the probability under the distribution of $\bar{x}$ that component i is gating. This probability can be expressed as the expectation:

$$G_i = \int \frac{\partial g_i(\vec{x},\vec{d})}{\partial d_i} f(\vec{x},\vec{\mu},\Sigma) d\vec{x} = \vec{a}_i \cdot \int \frac{\partial \vec{q}(\vec{x},\vec{d})}{\partial d_i} f(\vec{x},\vec{\mu},\Sigma) d\vec{x} \tag{6}$$

While $\partial \bar{q}(\bar{x},\bar{d})/\partial d_i$ may not be differentiable, the above integral may be seen as uniformly convergent in the Lebesgue sense. The order of integration and differentiation can be reversed, to yield the following expression for $G_i$:

$$G_i = \vec{a}_i \cdot \frac{\partial}{\partial d_i} \int \vec{q}(\vec{x},\vec{d}) f(\vec{x},\vec{\mu},\Sigma) d\vec{x} \tag{7}$$

The above equation provides the following expression for the gating risk $G_i$ for component i.

$$G_i = \vec{a}_i \cdot \frac{\partial \hat{\bar{q}}(\vec{d})}{\partial d_i} \qquad (8)$$

Where $\bar{q}(\vec{d})$ is the mean production given component availability $\vec{d}$.

The mean production $\bar{q}(\vec{d})$ may be understood in comparison to the mean demand value $\bar{\mu}$ 28 discussed above and depicted in FIGS. 2 and 3. In situations where the demand for a set of products falls into an infeasible region of FIG. 2, it is clear that the actual production will not be equal to the demanded production. In such situations, the actual production will be less for one or more products than the actual demand. Because of such situations, the mean production (averaged over the distribution of demand vectors) will be less than the mean demand $\bar{\mu}$ 28 (averaged over the distribution of demand vectors). The mean production may be calculated using multidimensional integrals to average the actual production over the probability distribution of the demanded production. The integration may be performed, for example, using Monte Carlo simulations, quadratures, or other techniques. Additional information on the integration may be found for example, in U.S. Provisional Patent Application No. 60/213,189, referenced above.

Figure 4:
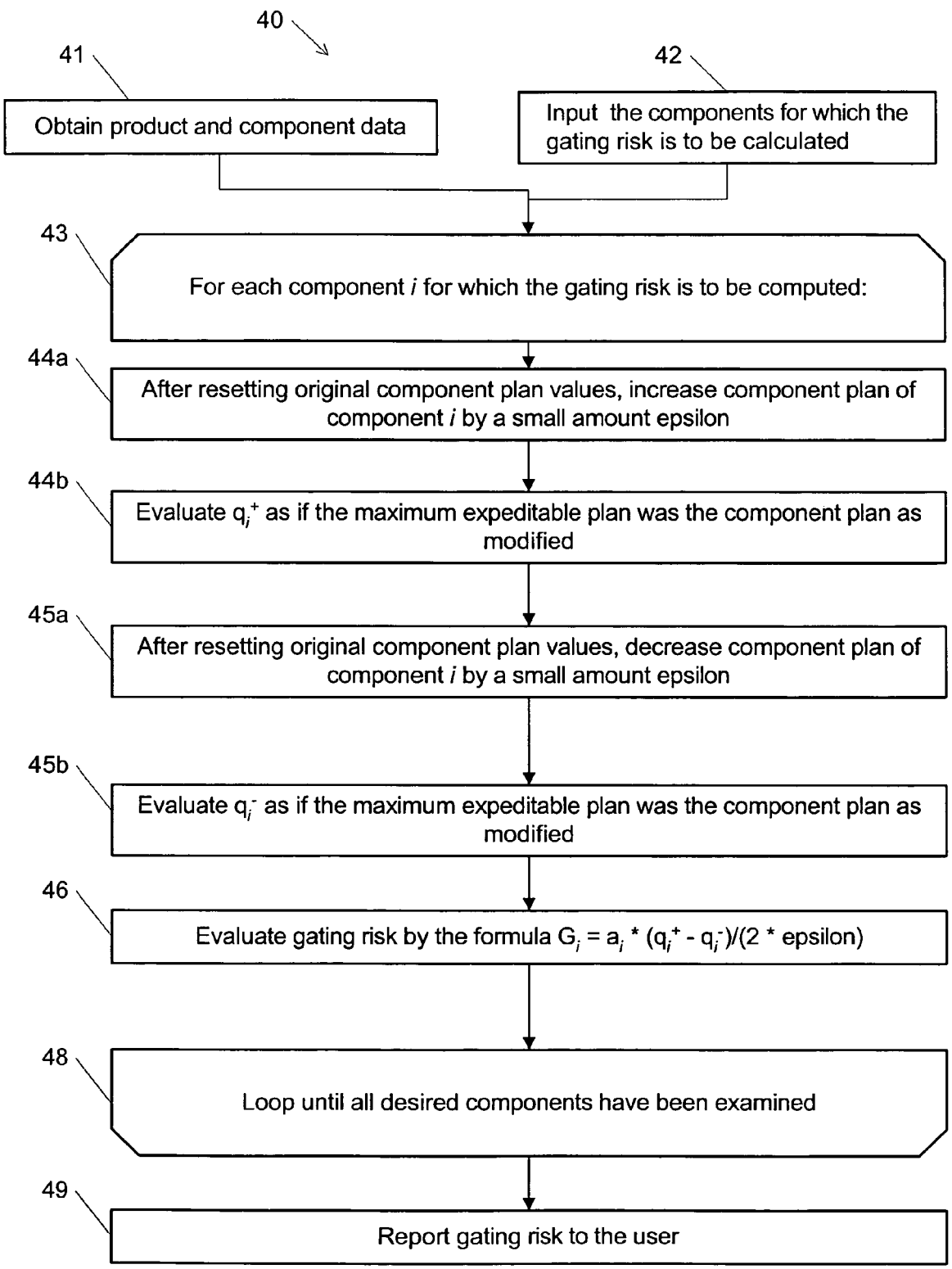
FIG. 4 is a flow diagram illustrating one embodiment of a procedure for calculating gating risk.

FIG. 4 is a flow diagram illustrating one embodiment of a procedure 40 for calculating gating risk. The procedure 40 commences in block 41 by gathering relevant data concerning components and products. The gathered data include, for example, information such as component consumptions or other information relating to connect rates, information such as component allocations or other information relating to maximum component availabilities, mean product demands or other information relating to expected demands, inter-product correlations or other information relating to the covariance of the relevant demand vector. In block 42, the components to be assessed are selected, for example by a user input or other input. The procedure then commences looping in block 43 through the various components for which the gating risk is to be determined.

In block 44a-46, a numerical derivative is calculated of production with respect to the available or expeditable quantity of the component under consideration. As illustrated, a first order difference is used to model the derivative. Other techniques for finding numerical derivatives may be used in addition or instead.

In block 44a, the component plan is reset to its original vale at the maximum expeditable or available plan. The availability of the component under consideration (component i) is then increased by a small increment epsilon. A typical value for epsilon is, for example, 1% of the component plan for component i. In block 44b, the mean production vector $q_i^+$ is calculated for the increased component plan. The mean production may be calculated using multidimensional integrals over the product space spanned by the demand vector. The integration may be performed, for example, using Monte Carlo simulations, quadratures, or other techniques. Additional information on the integration may be found for example, in U.S. Provisional Patent Application No. 60/213, 189, referenced above.

In block 45a, the component plan is reset to its original vale at the maximum expeditable or available plan. The availability of the component under consideration (component i) is then decreased by a small increment epsilon. In block 44b, the mean production vector $q_i^-$ is calculated for the decreased component plan.

In block 46, the gating risk is calculated through an application of Eq. 8 to the mean productions $q_i^+$ and $q_i^-$ for the increased and decreased component plan. Block 46 evaluates $a_i*(q_i^+ + q_i^-)/(2*\text{epsilon})$, where $a_i$ is the vector of connect rates for component i. In block 48 the looping from block 43 ends, and the procedure returns to block 43 to calculate gating risk for the next component (if any). The results of the calculation may be reported to a user in block 49.

Figure 5:
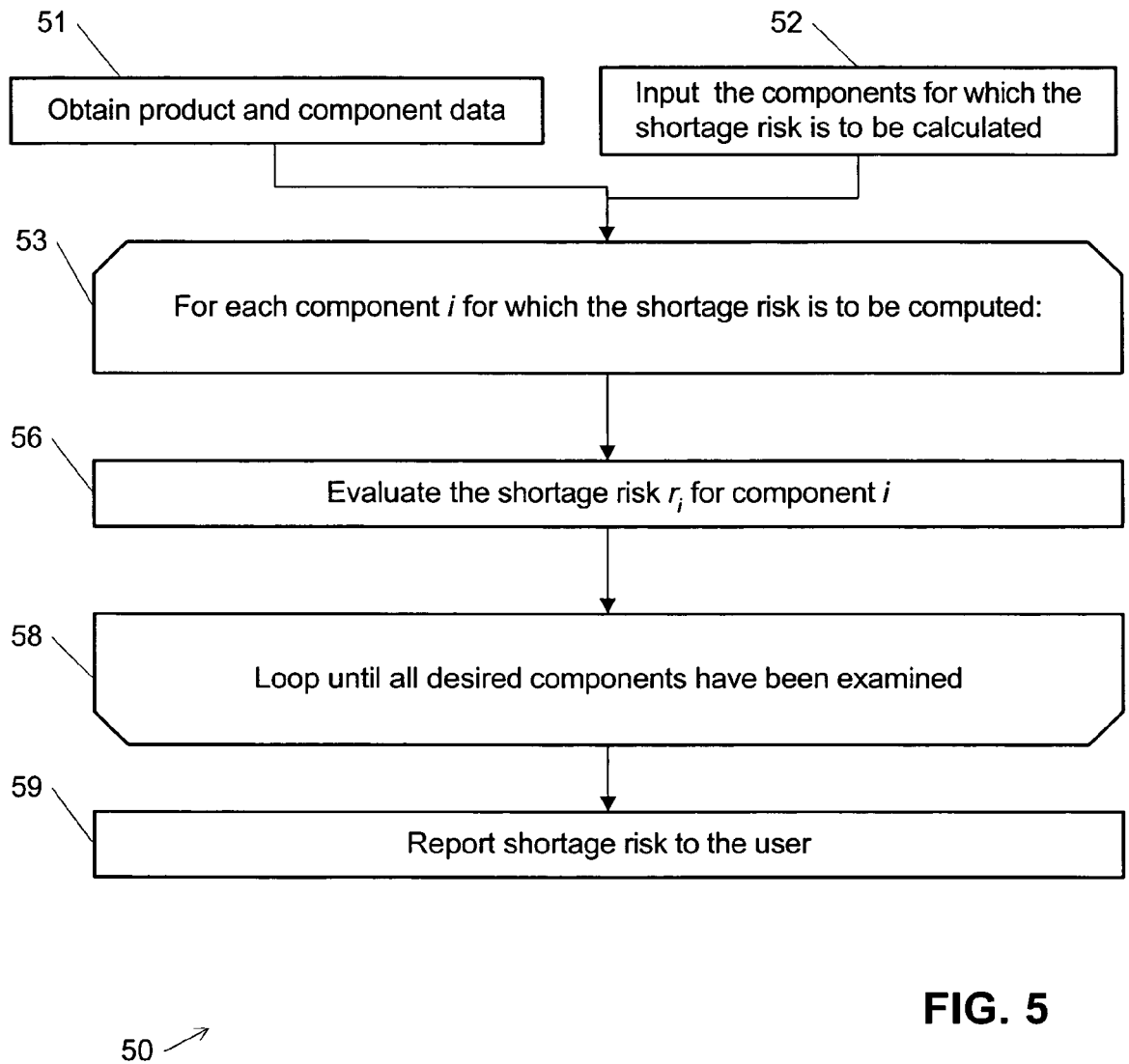
FIG. 5 is a flow diagram illustrating one embodiment of a procedure for calculating shortage risk.

FIG. 5 is a flow diagram illustrating one embodiment of a procedure 50 for calculating shortage risk. In block 51, the relevant data are gathered concerning components and products. In block 52, the components to be assessed are selected, for example by a user input or other input. The procedure then commences looping in block 53 through the various components for which the shortage risk is to be determined.

The shortage risk for a given component is evaluated in block 56. The evaluation applies Eq. 2 to calculate the shortage risk $r_i$ for a component i under consideration. In block 58 the looping from block 53 ends, and the procedure returns to block 53 to calculate gating risk for the next component (if any). The results of the calculation may be reported to a user in block 59.

An Example Computing and Network Environment

Figure 6:
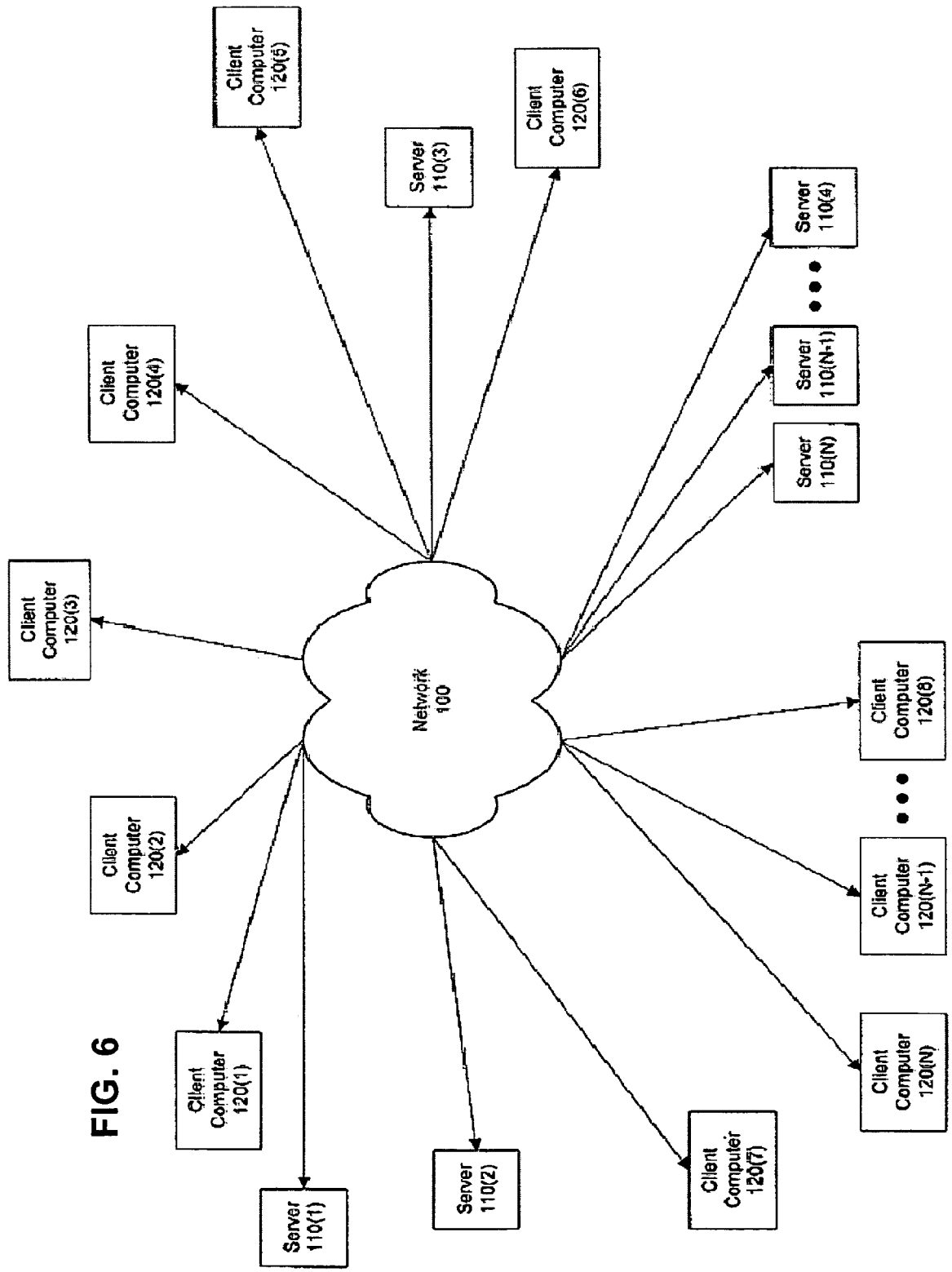
FIG. 6 is a block diagram illustrating a network environment in which processing according to embodiments of the present invention may be practiced.

FIG. 6 is a block diagram illustrating a network environment in which processing according to embodiments of a system according to the present invention may be practiced. As is illustrated in FIG. 6, network 100, such as a private wide area network (WAN) or the Internet, includes a number of networked servers 110(1)-(N) that are accessible by client computers 120(1)-(N). Communication between client computers 120(1)-(N) and servers 110(1)-(N) typically occurs over a publicly accessible network, such as a public switched telephone network (PSTN), a DSL connection, a cable modem connection or large bandwidth trunks (e.g., communications channels providing T1 or OC3 service). Client computers 120(1)-(N) access servers 110(1)-(N) through, for example, a service provider. This might be, for example, an Internet Service Provider (ISP) such as America On-Line™, Prodigy™, CompuServe™ or the like. Access is typically had by executing application specific software (e.g., network connection software and a browser) on the given one of client computers 120(1)-(N).

One or more of client computers 120(1)-(N) and/or one or more of servers 110(1)-(N) may be, for example, a computer system of any appropriate design, in general, including a mainframe, a mini-computer or a personal computer system. Such a computer system typically includes a system unit having a system processor and associated volatile and non-volatile memory, one or more display monitors and keyboards, one or more diskette drives, one or more fixed disk storage devices and one or more printers. These computer systems are typically information handling systems which are designed to provide computing power to one or more users, either locally or remotely. Such a computer system may also include one or a plurality of I/O devices (i.e., peripheral devices) which are coupled to the system processor and which perform specialized functions. Examples of I/O devices include modems, sound and video devices and specialized communication devices. Mass storage devices such as hard disks, CD-ROM drives and magneto-optical drives may also be provided, either as an integrated or peripheral device. One such example computer system, discussed in terms of client computers 120(1)-(N) is shown in detail in FIG. 7.

It will be noted that the variable identifier "N" is used in several instances in FIG. 6 to more simply designate the final element (e.g., servers 110(1)-(N) and client computers 120 (1)-(N)) of a series of related or similar elements (e.g., servers and client computers). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

Figure 7:
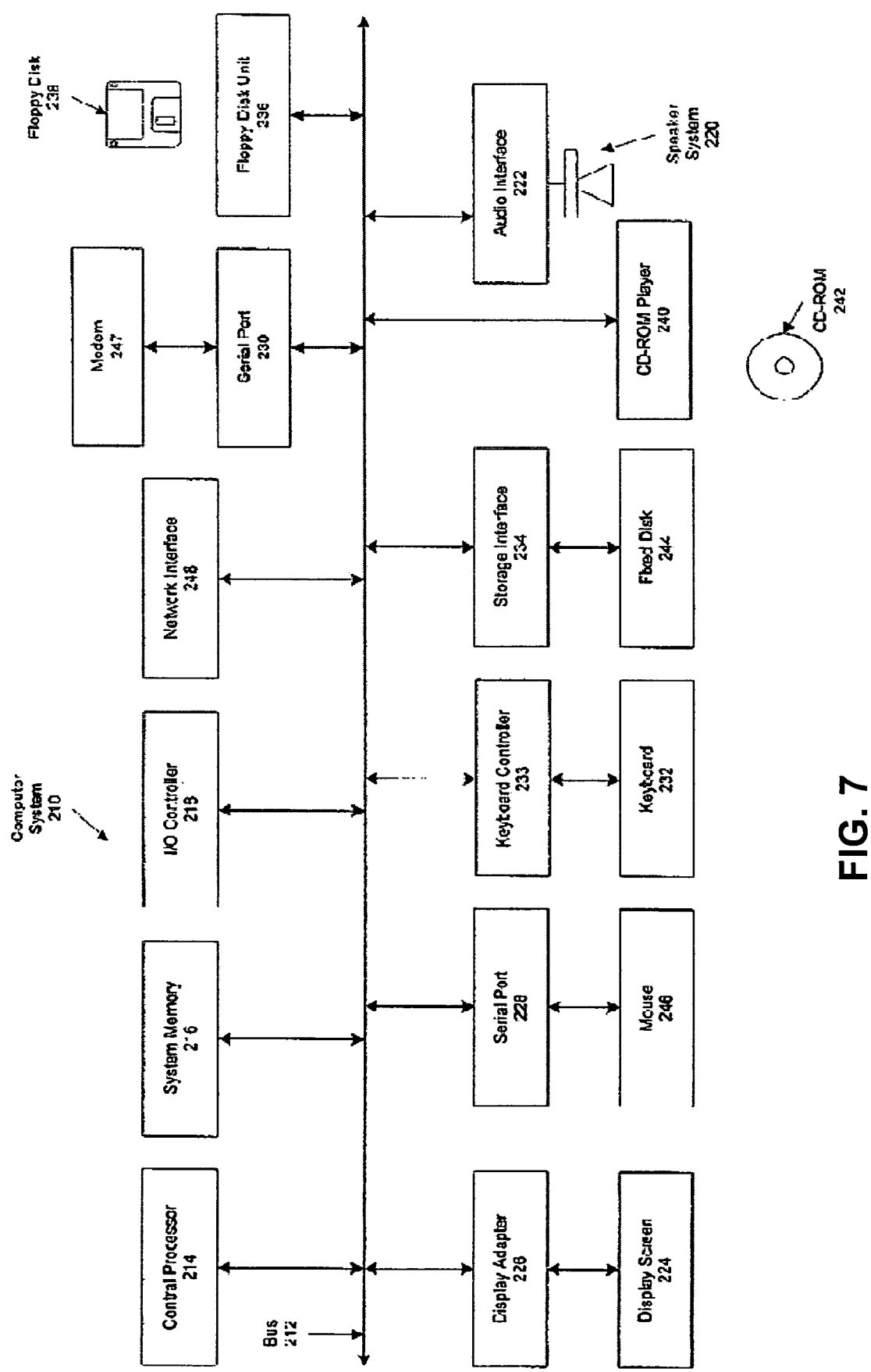
FIG. 7 is a block diagram illustrating a computer system suitable for implementing embodiments of the present invention.

FIG. 7 depicts a block diagram of a computer system 210 suitable for implementing embodiments of the present invention, and examples of one or more of client computers 120 (1)-(N). Computer system 210 includes a bus 212 which interconnects major subsystems of computer system 210 such as a central processor 214, a system memory 216 (typically RAM, but which may also include ROM, flash RAM, or the like), an input/output controller 218, an external audio device such as a speaker system 220 via an audio output interface 222, an external device such as a display screen 224 via a display adapter 226, serial ports 228 and 230, a keyboard 232 (interfaced with a keyboard controller 233), a storage interface 234, a floppy disk drive 236 operative to receive a floppy disk 238, and a CD-ROM drive 240 operative to receive a CD-ROM 242. Also included are a mouse 246 (or other point-and-click device, coupled to bus 212 via serial port 228), a modem 247 (coupled to bus 212 via serial port 230) and a network interface 248 (coupled directly to bus 212).

Bus 212 allows data communication between central processor 214 and system memory 216, which may include both read only memory (ROM) or flash memory (neither shown), and random access memory (RAM) (not shown), as previously noted. The RAM is generally the main memory into which the operating system and application programs are loaded and typically affords at least 16 megabytes of memory space. The ROM or flash memory may contain, among other code, the Basic Input-Output system (BIOS) which controls basic hardware operation such as the interaction with peripheral components. Applications resident with computer system 210 are generally stored on and accessed via a computer readable medium, such as a hard disk drive (e.g., fixed disk 244), an optical drive (e.g., CD-ROM drive 240), floppy disk unit 236 or other storage medium. Additionally, applications may be in the form of electronic signals modulated in accordance with the application and data communication technology when accessed via network modem 247 or interface 248.

Storage interface 234, as with the other storage interfaces of computer system 210, may connect to a standard computer readable medium for storage and/or retrieval of information, such as a fixed disk drive 244. Fixed disk drive 244 may be a part of computer system 210 or may be separate and accessed through other interface systems. Many other devices can be connected such as a mouse 246 connected to bus 212 via serial port 228, a modem 247 connected to bus 212 via serial port 230 and a network interface 248 connected directly to bus 212. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 7 to be present to practice the present invention. The devices and subsystems may be interconnected in different ways from that shown in FIG. 7. The operation of a computer system such as that shown in FIG. 7 is readily known in the art and is not discussed in detail in this application. Code to implement the present invention may be stored in computer-readable storage media such as one or more of system memory 216, fixed disk 244, CD-ROM 242, or floppy disk 238. Additionally, computer system 210 may be any kind of computing device, and so includes personal data assistants (PDAs), network appliance, X-window terminal or other such computing device. The operating system provided on computer system 210 may be MS-DOS®, MS-WINDOWS®, OS/2®, UNIX®, Linux® or other known operating system. Computer system 210 also supports a number of Internet access tools, including, for example, an HTTP-compliant web browser having a JavaScript interpreter, such as Netscape Navigator® 3.0, Microsoft Explorer® 3.0 and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 210). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Figure 8:
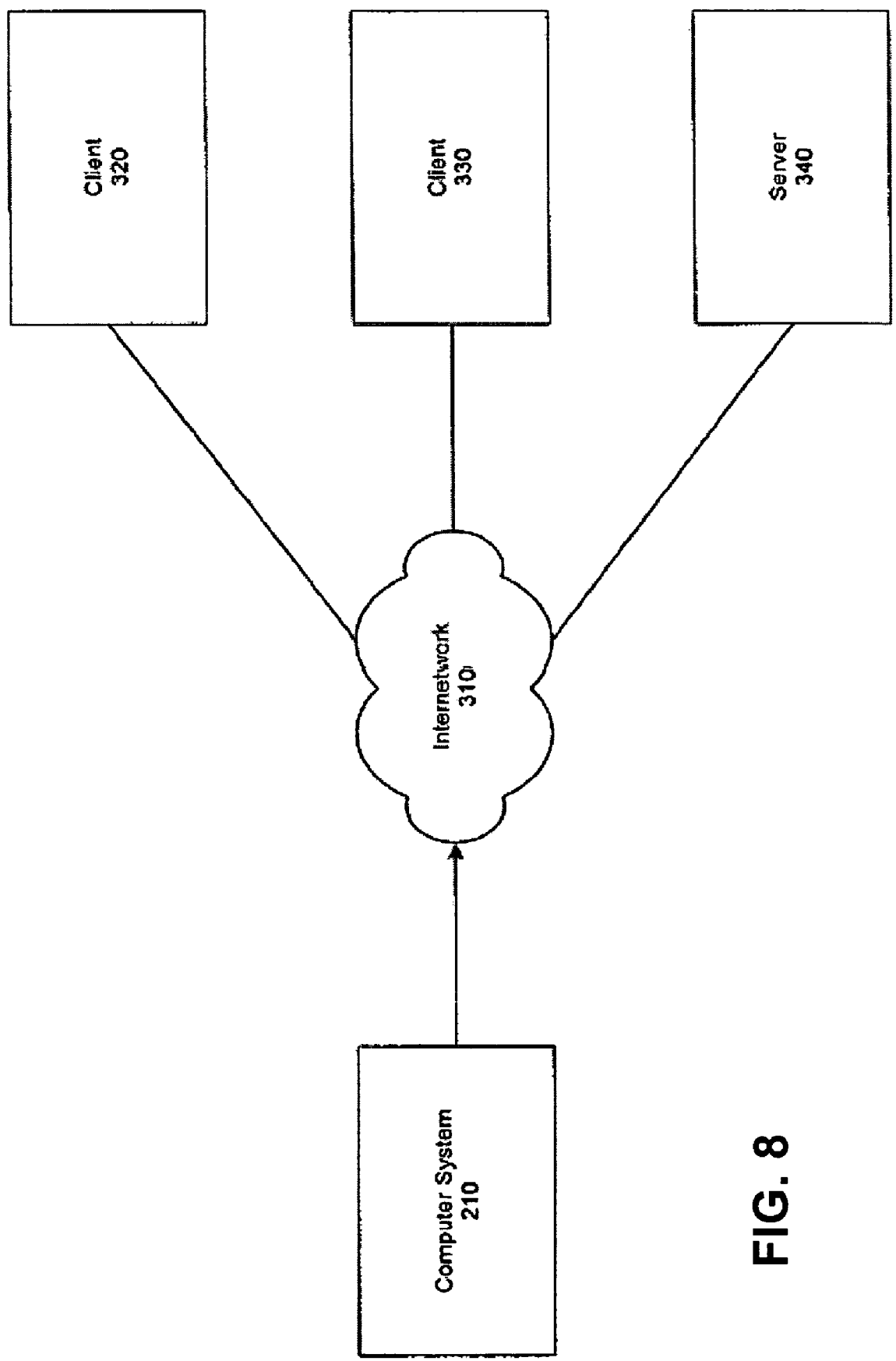
FIG. 8 is a block diagram illustrating the interconnection of the computer system of FIG. 7 to client and host systems.

FIG. 8 is a block diagram depicting a network 300 in which computer system 210 is coupled to an internetwork 310, which is coupled, in turn, to client systems 320 and 330, as well as a server 340. Internetwork 310 (e.g., the Internet) is also capable of coupling client systems 320 and 330, and server 340 to one another. With reference to computer system 210, modem 247, network interface 248 or some other method can be used to provide connectivity from computer system 210 to internetwork 310. Computer system 210, client system 320 and client system 330 are able to access information on server 340 using, for example, a web browser (not shown). Such a web browser allows computer system 210, as well as client systems 320 and 330, to access data on server 340 representing the pages of a website hosted on server 340. Protocols for exchanging data via the Internet are well known to those skilled in the art. Although FIG. 8 depicts the use of the Internet for exchanging data, the present invention is not limited to the Internet or any particular network-based environment.

Referring to FIGS. 1, 2 and 3, a browser running on computer system 210 employs a TCP/IP connection to pass a request to server 340, which can run an HTTP "service" (e.g., under the WINDOWS® operating system) or a "daemon" (e.g., under the UNIX® operating system), for example. Such a request can be processed, for example, by contacting an HTTP server employing a protocol that can be used to communicate between the HTTP server and the client computer. The HTTP server then responds to the protocol, typically by sending a "web page" formatted as an HTML file. The browser interprets the HTML file and may form a visual representation of the same using local resources (e.g., fonts and colors).

Various processes according to embodiments of the present invention are discussed herein. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagram may be executed by a module (e.g., a software module) or a portion of a module or a computer system user using, for example, a computer system such as the storage router previously mentioned, or a similar network element, as well as a computer system such as computer system 210. Thus, the above described method, the operations thereof and modules thereof may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

The software modules described herein may be received by such a computer system, for example, from computer readable media. The computer readable media may be permanently, removably or remotely coupled to the computer system. The computer readable media may non-exclusively include, for example, any number of the following: magnetic storage media including disk and tape storage media; optical storage media such as compact disk media (e.g., CD-ROM, CR-R, etc.) and digital video disk storage media; nonvolatile memory storage memory including semiconductor-based memory units such as FLASH memory, EEPROM, EPROM, ROM or application specific integrated circuits, volatile storage media including registers, buffers or caches, main memory, RAM, and the like; and data transmission media including computer network, point-to-point telecommunication, and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A computer-implemented method performed with a computer having a processor and a memory for estimating component shortage risk of a component used to make products during a manufacturing process, the component shortage risk for use in placing orders for the component to help ensure that sufficient units of the component are available during the manufacturing of the products, comprising:
   identifying the component used to make the products in the manufacturing process;
   computing by the processor a probability of shortage for the component based on
      statistical information regarding a demand for the products,
      a maximum expediable level of the component, and
      connect rates that describe a consumption of the component for each unit of the products
      wherein the probability of shortage is represented by the quantity r in the formula:

$$r = \int_d^\infty N(x, a\cdot\mu, \sqrt{a^T \Sigma a}) dx,$$

wherein:
         d is the maximum expediable level of the component,
         $N(x,\mu,\sigma)$ is a normal density function having a mean equal to $\mu$ and a variance equal to $\sigma^2$,
         a is a vector of the connect rates for the component, the connect rates describing a consumption of the component for each unit of the products,
         $\mu$ is a mean demand of the products, and
         $\Sigma$ represents a demand covariance between demand of a first of the products and demand of a second of the products; and
   generating an output based on at least the probability of shortage, the output representing the component shortage risk of the identified component for use in placing orders for the component to help ensure that sufficient units of the component are available during the manufacturing of the products.

2. The computer-implemented method of claim 1, wherein the computing comprises:
   determining the maximum expediable level of the component; and
   determining the connect rates for the component.

3. The computer-implemented method of claim 2, wherein the computing further comprises:
   determining the mean demand; and
   determining the demand covariance.

4. The method of claim 1, wherein the generating the output comprises storing data on a computer readable medium.

5. A computer program product for use in estimating component shortage risk of a component used to make products during a manufacturing process, the component shortage risk for use in placing orders for the component to help ensure that sufficient units of the component are available during the manufacturing of the products, comprising:
   a computer-readable medium;
   instructions, stored on the computer-readable medium, executable on a computer system, and configured to cause the computer system to:
      identify the component used to make the products in a manufacturing process;
      compute a probability of shortage for the component based on at least:
         statistical information regarding a demand for the products,
         a maximum expediable level of the component, and
         connect rates that describe a consumption of the component for each unit of the products,
      wherein the probability of shortage is represented by the quantity r in the formula:

$$r = \int_d^\infty N(x, a\cdot\mu, \sqrt{a^T \Sigma a}) dx,$$

wherein:
            d is the maximum expediable level of the component,
            $N(x,\mu,\sigma)$ is a normal density function having a mean equal to $\mu$ and a variance equal to $\sigma^2$,
            a is a vector of the connect rates for the component,
            $\mu$ is a mean demand of the products, and
            $\Sigma$ represents a demand covariance between demand of a first of the products and demand of a second of the products; and
      output the probability of shortage to represent the component shortage risk of the identified component for use in placing orders for the component to help ensure that sufficient units of the component are available during the manufacturing of the products.

6. The computer program product of claim 5, wherein the instructions are further configured to cause the computer system to:
   determine the maximum expediable level of the component; and
   determine the connect rates for the component.

7. The computer program product of claim 6, wherein the instructions are further configured to cause the computer system to:
   determine the mean demand; and
   determine the demand covariance.

8. An apparatus with a processor and memory, the processor for executing instructions stored in the memory, the instructions for estimating component shortage risk of a component used to make products during a manufacturing process, the apparatus comprising:
   means for using the processor and memory to identify the component used to make the products in a manufacturing process;
   means for using the processor and memory to compute probability of shortage for the component based on at least:
      statistical information regarding a demand for the products,
      a maximum expediable level of the component, and
      connect rates that describe a consumption of the component for each unit of the products
      wherein the probability of shortage is represented by the quantity r in the formula:

$$r = \int_d^\infty N(x, a\cdot\mu, \sqrt{a^T \Sigma a}) dx,$$

wherein:
            d is the maximum expediable level of the component,
            $N(x,\mu,\sigma)$ is a normal density function having a mean equal to $\mu$ and a variance equal to $\sigma^2$, a is a vector of the connect rates for the component, μ is a mean demand of the products, and Σ represents a demand covariance between demand of a first of the products and demand of a second of the products; and means for using the processor and memory to generate an output based on at least the probability of shortage, the probability of shortage representing the component shortage risk of the identified component.

9. The apparatus of claim 8, wherein the means for using the processor and memory to compute comprises:

means for determining the maximum expeditable level of the component; and means for determining the connect rates for the component.

10. The apparatus of claim 9, wherein the means for using the processor and memory to compute further comprises:

means for determining the mean demand; and means for determining the demand covariance.

* * * * *